(12) United States Patent
Milgramm

(10) Patent No.: US 8,046,590 B2
(45) Date of Patent: Oct. 25, 2011

(54) SYSTEM AND METHOD FOR PROTECTION OF CREATIVE WORKS

(76) Inventor: Mikhail Milgramm, Valley Stream, NY (US)

( * ) Notice: Subject to any disclaimer, the term of this patent is extended or adjusted under 35 U.S.C. 154(b) by 985 days.

(21) Appl. No.: 11/761,797

(22) Filed: Jun. 12, 2007

(65) Prior Publication Data

US 2008/0313718 A1 Dec. 18, 2008

(51) Int. Cl.
G06F 21/00 (2006.01)
G06F 7/04 (2006.01)
G06F 12/14 (2006.01)
G06F 17/30 (2006.01)

(52) U.S. Cl. .............................. 713/186; 726/5; 726/18

(58) Field of Classification Search .................. 713/186; 726/5, 18

See application file for complete search history.

(56) References Cited

U.S. PATENT DOCUMENTS

| | | | | |
|---|---|---|---|---|
| 6,424,249 | B1 * | 7/2002 | Houvener | 340/5.82 |
| 7,334,130 | B2 * | 2/2008 | Bowers | 713/186 |
| 2001/0032096 | A1 * | 10/2001 | Uchida | 705/1 |
| 2004/0073453 | A1 * | 4/2004 | Nenov et al. | 705/2 |
| 2004/0162981 | A1 * | 8/2004 | Wong | 713/161 |

* cited by examiner

*Primary Examiner* — Kambiz Zand
*Assistant Examiner* — Aubrey Wyszynski
(74) *Attorney, Agent, or Firm* — John F. Vodopia

(57) ABSTRACT

The inventive method for protection of creative works is accomplished by creating a creative work, securing the creative work using biometric information of an author of the creative work, and restricting an access to the creative work to the author and select users, who are authorized by the author and whose biometric information is registered with a biometric security database.

20 Claims, 4 Drawing Sheets

SYSTEM AND METHOD FOR PROTECTION OF CREATIVE WORKS

FIELD OF THE INVENTION

The present invention relates generally to a system and method for protection of creative works using biometric security based on biometric identification and verification.

BACKGROUND OF THE INVENTION

In view of the tremendous opportunities and advantages of cybernetics and phenomenal growth of internet, mobile technologies, digital instrumentation, there have arisen serious concerns in the arena of protecting intellectual property rights of creative digital works, for example, software, digital images, digitized music, e-books, etc. The growth of digital information transmission worries copyright holders who fear that the new technology threatens their rights because of greater piracy, increased theft of digital works at the information transfer stage and widespread sharing of digital works.

Piracy copying of software, particularly software adapted to run on personal computers, is an extensive problem to software vendors which annually costs them large amounts of money. On average, the software industry loses about US$11 to US$12 billion in revenue to software piracy annually. The conventional methods employed to protect software against unauthorized utilization by demanding a password for the installation or operation of a specific computer program or program package, for example, have not provided sufficient security.

Several attempts have already been made to establish arrangements in which simply typing a required password is not sufficient to gain access to a program. For example, systems have been proposed which require that a special hardware unit is connected to the computer to make it possible to utilize a given program. This unit may take the form of a blind plug (also termed "dongle"), for example, which is connected directly to one of the input-output terminals of the computer, and containing fixed tables, identity number, or the like, stored in an internal memory from which information is read upon the request of a programmed additional routine included for this purpose in the application program in question. The unit may also take the form of a card reader station, or the like, in which a card is inserted, the matter stored on the card in principle being similar to that of the blind plug above. Usually the checking procedure involves that the additional routine of the program makes a direct comparison of the program identity, for example, and a corresponding item of information present in the stored table. Thus, an arrangement making it possible to use a certain computer program or a computer program package only if the permission of the copyright holder really exists would be of great importance.

One attempt to address the above challenges was a proposed utilization of biometric access control systems by the sending and receiving party to authenticate the identity of the sending and receiving party. The use of biometric technologies has previously gained some acceptance in the field of content access control, and so, application of such technologies to the goal of securing copyrighted content is a reasonable approach.

Biometrics is a field of technology aimed at utilizing one or more unique personal characteristics of an individual, ranging, for example, from their fingerprints to their hand vein pattern, odor, iris image, or their DNA, to authenticate their identity. Biometric technologies are typically of two types—passive and active. Passive biometrics either do not require the individual who's identity is being verified to do anything other than to enable a certain biometric characteristic to be acquired by the system (e.g., by placing a finger on a fingerprint scanner, by looking into a retinal scanner, or by looking in the direction of a facial scanner). Active biometrics require the individual who's identity is being verified to perform one or more predetermined actions in order to enable the system to acquire the representation of one or more appropriate biometric characteristics (e.g., by providing a signature, by speaking, by squeezing a certain object, etc.). Certain types of biometric systems may incorporate a combination of active and passive biometric approaches. The various types of biometric systems are discussed in greater detail in the U.S. patent application Ser. No. 11/332,017 entitled "MULTI-PLATFORM INDEPENDENT BIOMETRIC IDENTIFICATION SYSTEM", which is incorporated herein by reference in its entirety.

It would thus be desirable to provide a system and method for restricting access to creative digital works to one or more specific identified individuals. It would further be desirable to provide a system and method for preserving the identity of the author of a particular creative work and the date and location of its creation. It would additionally be desirable, to provide a system and method for registering, tracking and biometrically verifying identities of users/licensees of various creative works.

SUMMARY OF THE INVENTION

The inventive data processing system and method enable protection of creative works using biometric information of their authors and other authorized individuals.

In one embodiment of the inventive method for protection of creative works, the method includes creating a creative work, securing the creative work using biometric information of an author of the creative work, restricting an access to this creative work to the author and authorized individuals who are authorized by the author and whose biometric information is registered with a biometric security database.

In one embodiment of the inventive system for protection of creative works, the system includes a first level at which a creative work is created and a second level at which the creative work is uploaded for secured storage and distribution. The first level includes a first biometric device identifying and verifying biometric information of a user, a first biometric database storing the biometric information of the user, a creative device for creation of the creative work, a memory and a processor. The second level includes a second biometric database and a creative works database. The creative work created at the first level is at least temporarily stored at the memory of the first level. Access to the creative work temporarily stored at the memory is restricted to select users whose biometric information is stored in the first biometric database. When the creative work is uploaded at the second level, the creative work is stored at the creative works database, and the access to the creative work stored at the creative works database is restricted to select users whose biometric information is stored in the second biometric database.

In a further embodiment of the inventive system and method, which may be utilized on its own or in conjunction with the previously described embodiments, one party is a licensor of a licensed product incorporating the creative digital work. In accordance with this embodiment, a license activation method is accomplished by purchasing the licensed product by a first party from a second party; conveying the licensed product by the second party to the first party; verifying an identity of a recipient of the licensed product using a biometric security management system; and activating a license associated with the licensed product when the biometric security management system verifies the identity of the recipient of the licensed product.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF PREFERRED EMBODIMENTS

Figure 1:
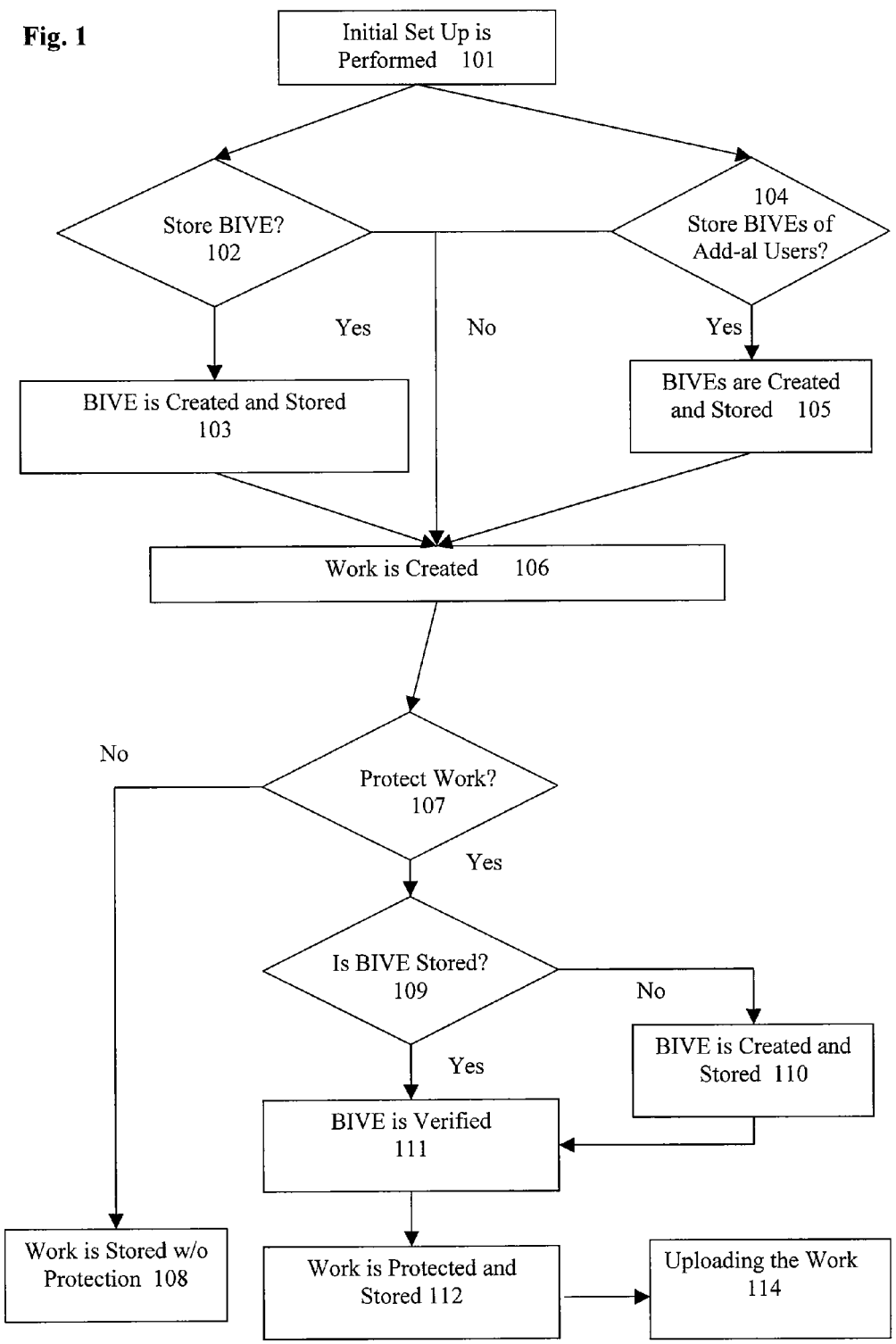
FIG. 1 shows a logic flow diagram of an exemplary embodiment of a process of implementing and utilizing the systems of FIGS. 2-3.

The system and method of the present invention remedy the disadvantages of previously known solutions directed at protection of creative works.

Because the terminology that may be currently utilized to describe the various embodiments of the novel system (and its functionality), evolves and changes rapidly, for the purposes of clarity, and without departing from the spirit of the invention, the various elements, components, infrastructures, and process steps of the inventive system and method, are described in Table 1, and further below, in terms of their required or desired functionality, and/or in terms of objectives they are intended to accomplish, in accordance with the present invention, rather than as specific structural and/or process implementations, which may change in nomenclature with advances in information systems technology. Table 1 is provided for convenience only and is not meant to be an exhaustive list of possible interpretations of utilized terms.

For example, as computers of various types are well known in the art, it is presumed that any computer used in conjunction with the present invention, will include the typical components necessary for its operation, e.g., one or more CPUs, memory, long term data storage, and, in cases of computers typically utilized by users, one or more input devices, a display, and so on. In addition, because a number of abbreviated terms are used for the sake of convenience in FIGS. 1 to 5, and further below, Table 1 also provides the definitions of some abbreviated terms used herein.

TABLE 1

Definitions/Terminology

| # | Term | Definition |
|---|---|---|
| 1 | Creative Work | For purposes of the present application, the term "creative work" refers to any work of authorship, regardless of the means of its creation, including but not limited to the types and definitions set forth in 17 U.S.C. §101 and 102. |
| 2 | Author | An individual, a group of individuals or a company responsible for creation of the creative work or a legal owner of a creative work created by somebody else. |
| 3 | User | A user is defined as:<br>1. Any party that desires to securely and/or verifiably store or transfer to another party (or parties) a creative work, whether by transmission thereto, or by granting (to the other party or parties) secured access to content that includes the creative work, and/or<br>2. Any party that desires to have an access to a creative work from another party (or parties).<br>Thus, in accordance with the present invention, users may range from private individuals, to members of groups of any type and with any amount of hierarchical levels and subgroups and that may be readily overlap with other groups (e.g., Groups of friends, family members, employees of a corporation, government employees and/or officials of varying ranks in one or more agencies, students of a particular university, etc.) |
| 4 | BIVS | Biometric Identity Verification System |
| 5 | BIVD | Biometric Identity Verification Device |
| 6 | BIVA | Biometric Identity Verification Application |
| 7 | Information/ data/ content | As defined herein, information, data, or content, may be of any type and in any number of formats that can be, in whole or in part, transmitted, interacted with (e.g., Viewed, modified, reviewed, etc.), Generated, acquired, analyzed, deleted, reviewed, and/or otherwise processed by an infotr system. For example, information may include, but is not limited to, one or more of the following: text, images, audio, video, transactional information, instrument or sensor readings (e.g., Medical, scientific, military), links to other data, executable programs and supporting files, etc. Additionally, data may be static, interactive, or a combination of both.<br>While it may be used interchangeably with "information" or "data", the term "content" preferably represents certain desirable information that is of interest to one or more parties, access to which is controlled by one or more parties. |
| 8 | Communication link | As defined herein, a communication link is preferably any form of a communication connection between the various components of the inventive system that enables data transmission of the appropriate types of information therebetween.<br>Each communication link may include, but is not limited to, one or more of the following, in any combination: direct telecommunication lines(s), wireless link(s) (e.g., Satellite uplink, radio, cellular, Wi-Fi, etc.), and communication network(s) (such as a LAN (local area network), a WAN (wide area network), or the Internet). |
| 9 | BIVE | Biometric Identity Verification Element. |
| 10 | LAS | License Activation Server (see FIGS. 4-5 and accompanying description) |
| 11 | LAC | License Activation Component (see FIGS. 4-5 and accompanying description) |

It should be noted, that the specific numbers of users, and corresponding systems shown in the various FIGS. 1 to 5, are provided by way of example only. Because the inventive system is completely scalable, it may be used in configurations ranging from as few as two users, to as many as practically possible, as a matter of design choice or convenience, without departing from the spirit of the invention.

As described further below, the system of the present invention includes at least two levels: Level 1—the level where the creative digital work is created and initially stored (e.g., a digital camera, a personal computer, a mobile device, a scanner, a digital audio recorder, etc.), and Level 2—the network level, where the creative digital work is stored for subsequent protection and/or utilization. As described further below, an intermediary Level 1a, for example, a host computer, may be provided for an intermediate storage and transfer of creative digital works.

Figure 2:
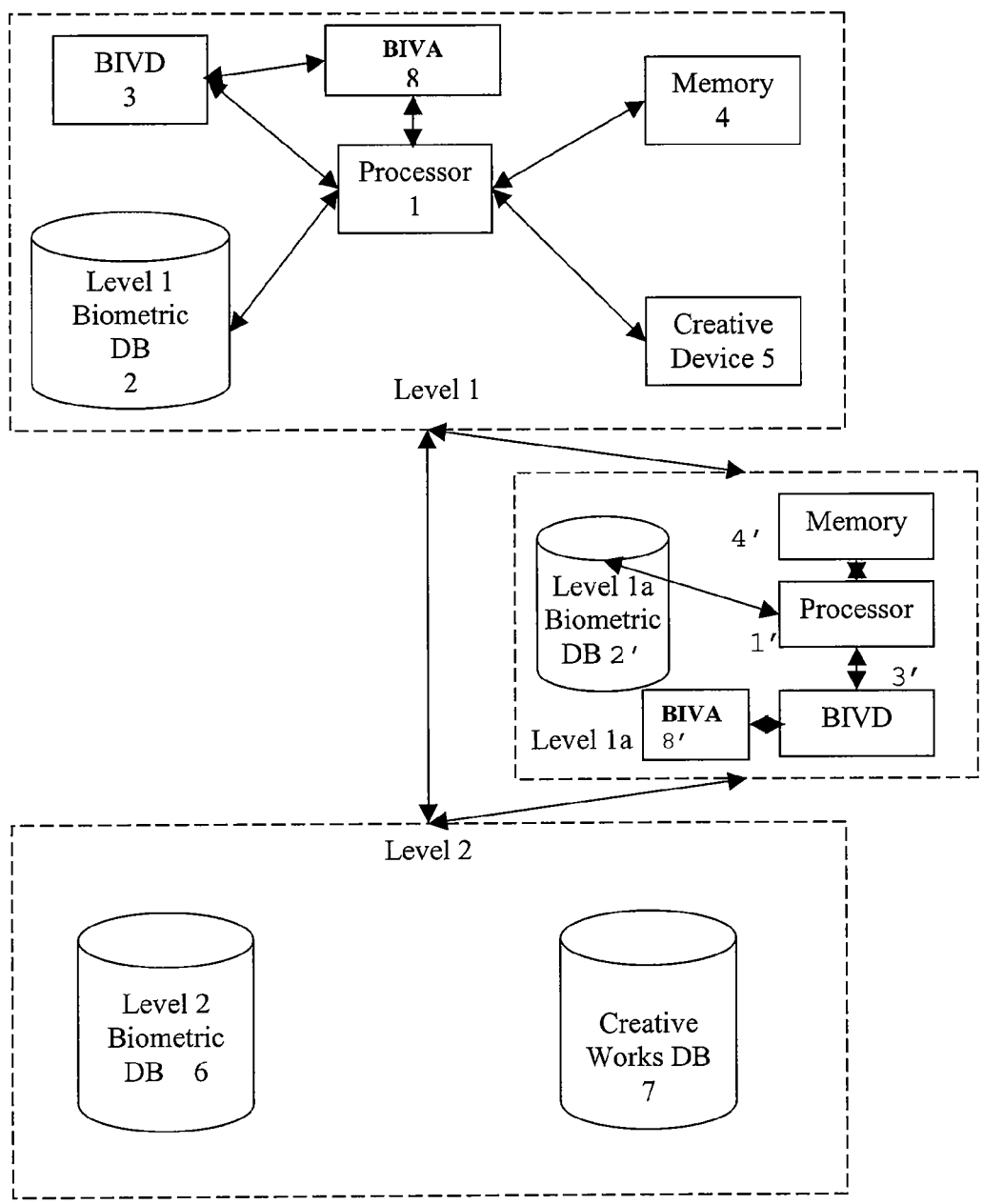
FIG. 2 shows a block diagram of a first exemplary embodiment of the inventive system, that enables securing access to works of authorship through biometric identity verification.

The system is generally illustrated in FIG. 2 showing Level 1 elements including the processor 1, the memory 4, the Level 1 biometric database 2, the biometric identification and verification device (BIVD) 3 for acquiring biometric information from a user and a corresponding biometric identity verification application (BIVA) 8 for controlling the operation of the BIVD 3 and for enabling the acquired biometric characteristics to be used for identity verification. BIVD 3 in combination with the BIVA 8 generate a user biometric identity verification element (BIVE), representative of the biometric information acquired by the BIVD, and process it for storage in the biometric database 2 (as well as biometric databases of other system levels) and use in future user identity verification (e.g., by creating a recognition template, or otherwise). It should be noted that more than one BIVD with its corresponding BIVA (e.g., fingerprint scanner(s), iris scanner(s), face identifier(s), etc.) may be utilized at Levels 1 or 1a of the present system. Additionally, Level 1 includes a creative device 5, i.e., the device that is used by the author to assist in creation of the creative work. Depending on an actual implementation of the claimed invention, creative device 5 may be an image capturing device of a digital camera, software assisting in creation of a digital work, a sound recording and digitizing device, etc.

Level 2 preferably includes at least a biometric database 6 for storing BIVEs of users registered with Level 2 network and a creative works database 7 for storing and protecting creative works uploaded to Level 2. Only users whose BIVEs are registered with the biometric database 6 and who are authorized by the author will have an access to the creative work in the creative works database 7. The author or an owner of the creative work stored in the creative works database may create various rules with respect to accessing, viewing, using, selling, purchasing, distributing and other rights with respect to its creative work.

Level 1a preferably includes a processor 1', a Level 1a biometric database 2', memory 4', BIVD 3' and BIVA 8'. Functions of Level 1a elements are similar to the functions of the equivalent elements of Level 1, described above.

FIG. 1 is a logical flow chart illustrating the method for protecting creative works, in accordance with the preferred embodiment of the present invention. As shown in FIG. 1, at the initial setup step 101, an author is asked whether he/she wants to create and store his/her biometric information (step 102), i.e., BIVE. More than one person may be designate as the author. Therefore, multiple biometric enrolments are possible with the present system. As explained above, BIVE is created using a biometric scanning device ("BIVD") and, in accordance with step 103, is stored in the Level 1 Biometric Database. If there are additional users of the system, their BIVEs may also be created and stored at the time the initial set up is performed (steps 104-105). Next, author creates a creative work (step 106) and has a choice of protecting this work using his/her biometric information (step 107). If no protection is desired, the work is ordinarily stored on an appropriate storage means, for example, memory 4 or 4' (step 108). If, however, the author desires to protect the creative work, the system will first check whether the author's BIVE was previously stored (step 109). If no such information was previously stored, the author will be asked to use the attached BIVD to create BIVE and to store this information in the Level 1 Biometric Database (step 110). The author's BIVE is then verified (step 111), and the work is protected and stored (step 112). It should be noted that in accordance with the preferred embodiment of the present invention, the creative work may be encrypted using any known encryption method prior to being stored. To access, the protected work, the author will need to submit his/her BIVE using the BIVD and verify this BIVE by comparing it to the BIVE previously stored in Level 1 Biometric Database. Additionally, the author may designate other individuals allowed to access the protected work. All such individuals will need their BIVEs to be stored in Level 1 Biometric Database. As will be obvious to a person skilled in the art, the additional step of encryption is not necessary to protect the creative work. The work may simply be protected by biometrically securing access to such work in the manner described above.

The protected work may then be uploaded to an intermediate Level 1a or the network Level 2 of the inventive system and distributed or licensed as described below (step 114).

Figure 3:
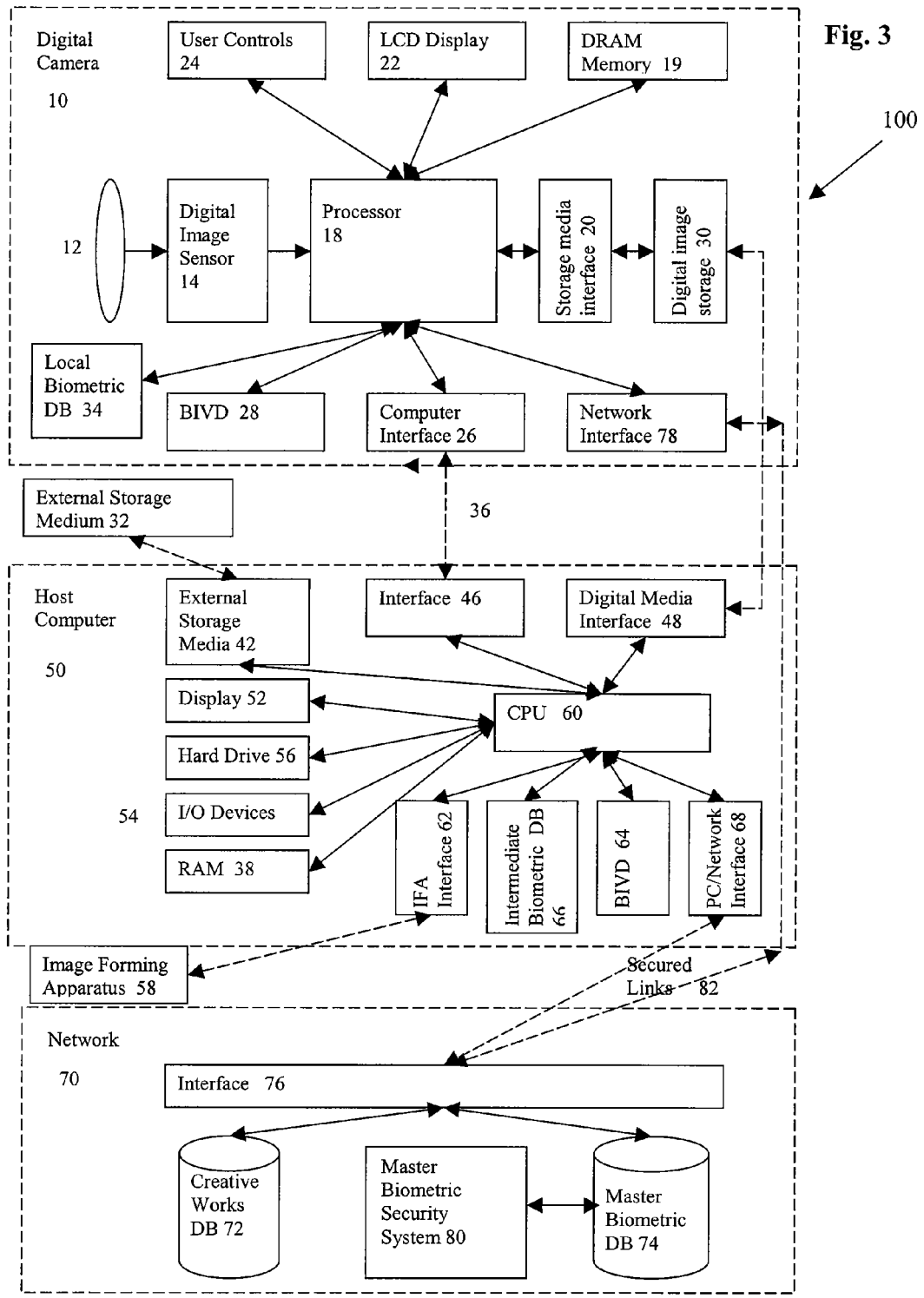
FIG. 3 shows a block diagram of a second exemplary embodiment of the inventive system, that enables securing access to works of authorship through biometric identity verification.

The creative work protection system 100 useful in practicing the method of the present invention, which enables users to easily secure, authenticate, and store their creative works, is described with reference to FIG. 3. Although FIG. 3 explains the use of the inventive system and method in connection with creation and utilization of digital images created by a digital camera (i.e., Level 1), it should be noted that the present system is not restricted to such use, as will be apparent to a person skilled in the art.

In accordance with one preferred embodiment, system 100 includes a digital camera 10, a host computer 50 and a network 70. Digital camera 10 produces digital images that are stored on a removable digital image storage medium (e.g., a memory card) 30 or other digital storage device. Digital camera 10 has a zoom lens 12 that is controlled by a zoom switch (not shown) having telephoto (T) and wide angle (W) positions, and having zoom and focus motor drives (not shown), and an adjustable aperture and shutter (not shown) for focusing light from a scene onto an image sensor 14. The image sensor 14 can be, for example, a single-chip, colored, charge-coupled device (CCD), using the well-known Bayer color filter pattern. When the user depresses a shutter button (not shown), the analog output signal from the image sensor 14 is converted to digital data by an analog-to-digital (A/D) converter (not shown). The digital data is processed by a processor 18 that is controlled by firmware stored in a reprogrammable memory, such as a Flash EPROM (not shown).

Digital camera 10 is further supplied with a biometric identification system (BIS), which utilizes one or more unique personal characteristics of camera users registered therewith, to verify their identity. BIS preferably includes a biometric identity verification device (BIVD) 28 for acquiring biometric information from a user, and a corresponding biometric identity verification application (BIVA) (not shown) for controlling the operation of the BIVD, and for enabling the acquired biometric characteristics to be used for identity verification. BIVA software may be provided with the digital camera on a compact disc, CD-ROM, a floppy disk, or other digital media and installed on the host computer 50 or directly on the digital camera 10 (possibly, as part of the firmware) at the time of the initialization of the digital camera, i.e., prior to taking pictures. Thus, in accordance with one preferred embodiment of the present invention, BIVA software is executed external to the digital camera 10, and is executed on the host computer 50. However, the BIVA software can alternatively be executed by an Internet appliance, set-top box, or other external device, or can be executed internal to the digital camera 10, provided that the digital camera has an appropriate user interface for displaying and responding to questions. BIVEs of the author and other authorized users may be stored in a local biometric database 34.

The processed digital image file is provided to a digital storage interface 20 which stores the digital image file on the removable digital image storage medium 30, or on another type of digital memory device, such as a floppy disk or magnetic hard drive, or smart media. The removable digital image storage medium 30, which is well-known to those skilled in the art, can include, for example, a memory card adapted to the PCMCIA card interface standard, as described in the PC Card Standard, Release 2.0, published by the Personal Computer Memory Card International Association, Sunnyvale, Calif., September 1991. The removable digital image storage medium 30 can also be adapted to the Compact Flash interface standard, such as described in the Compact Flash Specification Version 1.4, published by the CompactFlash Association, Palo Alto, Calif., July 1999, or to other memory devices such as the well-known SSFDC (Solid State Floppy Disc Card) or Memory Stick formats.

Processor 18 performs color interpolation followed by color and tone correction, in order to produce rendered sRGB image data. The processor 18 can include internal buffer memory to store a portion of the image, or to store one or more entire images. Alternatively, the processor 18 can use a separate external memory, such as DRAM memory 19. The rendered sRGB image data is then JPEG compressed and stored as a JPEG image file on the removable digital image storage medium 30. The processor 18 also provides a lower resolution or "thumbnail" size image data to an LCD display 22, which displays the captured image for the user to review. Several camera user buttons provided as part of the user controls 24 are used to control the digital camera 10. User controls 24, together with text and icons displayed on the LCD display 22, form the camera graphical user interface (GUI). This GUI is controlled by the user interface portion of the firmware stored in the Flash EPROM.

The digital camera 10 determines various metadata items, such as the date/time the picture was taken from the real-time clock (not shown) provided by the processor 18. Additionally, a place of the creation may also be preserved by entering the place identifying information using the GUI. After a series of images has been taken by the digital camera 10 and stored on the removable digital image storage medium 30, the removable medium 30 can be inserted into an appropriate reader 48 communicatively attached to or incorporated within the host computer 50. Alternatively, an interface cable 36 can be used to connect between a host interface 26 in the digital camera 10 and a camera interface 46 which may be external or internal to the host computer 50. The interface cable 36 may conform to, for example, the well-known universal serial bus (USB) interface specification.

The captured images from the digital camera 10 can be downloaded to the host computer 50 and stored on a hard drive 56 under the control of a central processing unit (CPU) 60. As conventionally known, host computer 50 includes RAM memory 38, and the CPU 60 is coupled to a display monitor 52, which is used to view the images, and various input/output devices 54 (e.g., a keyboard).

In an alternative embodiment, previously created creative works can be stored on an external storage medium 32. Examples of the external storage medium 32 include a CD ROM, a DVD, an external hard drive, a floppy disk, an MP3 player and a flash drive. However, as it is apparent to a person skilled in the art, the present invention is not limited to these exemplary devices. CPU 60 communicates with an External Media Storage Interface 42 in order to read the information from the external storage medium 32. External media storage interface 42 can be a CD ROM drive, a floppy disk drive or any other appropriate interface.

To protect creative works and other information stored on the host computer 50, a host BIS is provided on the host computer. Host computer BIS preferably includes a host BIVD 64 for acquiring biometric information from a user, a corresponding BIVA (not shown) and an intermediate biometric database 66 for storing BIVEs of registered users.

CPU 60 further communicates with an image forming apparatus (IFA) 58 through an IFA interface 62. IFA 58 can be a local printer, a copier, a facsimile apparatus or a scanner. IFA 58 may be utilized to produce hard copy prints of the images that were captured by the digital camera 10, to print hard copies of other creative works created on the host computer 50, to upload a digital copy of a creative work existing in a hard copy (e.g., by scanning a hard copy of a manuscript) or to upload a digital copy of a creative work transmitted from another location. Similarly to the digital camera 10, IFA 58 can create a date stamp associated with the creation, upload or transmission of a particular creative work.

In accordance with the preferred embodiment, the creative work is uploaded to the network 70 having a creative works database 72 for storage and protection of uploaded creative works and a network biometric database 74. As shown in FIG. 3, network may further include a master biometric security system 80 working with the master biometric database 74 to register and store biometric information of authorized users. Biometric security system 80 may be implemented as part of the network 70 (as shown in FIG. 3) or as a free-standing application service provider (ASP) connected to the network 70. Further, biometric security system 80 may be implemented as an independent biometric security server described in U.S. Pat. No. 6,993,659, fully incorporated herein by reference. Network 70 further includes an interface 76 for interfacing with various local or intermediary devices via secure communication links 82. Communications with the host computer 50 are preferably accomplished via the PC/Network interface 68. Similarly, communications with the digital camera 10 are preferably accomplished via the network interface 78. Further elements and functions of network 70 are described below in connection with distribution of creative works.

As described above in connection with FIGS. 1-3, an author creates his/her creative work 200 using digital equipment, e.g., a personal computer, a digital camera, a mobile device, etc. This digital equipment may be preliminary set up to have a biometrically secured access to the digital equipment and information stored thereon. As further described above, the author secures the work by attaching his/her biometric information, a date stamp and possibly a place of creation information to the work. The work may be further locally protected by encryption. Only authorized users whose biometric information is registered with a biometric identification system of the digital equipment will be allowed to access the creative work 200.

According to the copyright law, copyright protection attaches to work 200 at the time of creation. To ensure that the creative work itself, its date and place of creation are preserved, the author registers his/her biometric information using the master biometric security system and uploads work 200 to the Level 2 network. As the author uploads work 200, he/she provides the biometric information using the biometric scanning device. The system identifies the author using the previously stored biometric information and creates a date stamp and optionally a place of creation stamp for work 200.

The name of the author, the date stamp and the place stamp are then attached to the work such that the date, the place and the author of the work may be later verified, if necessary. Further, work 200 may then be distributed with the attached information, as described in more detail below.

Figure 4:
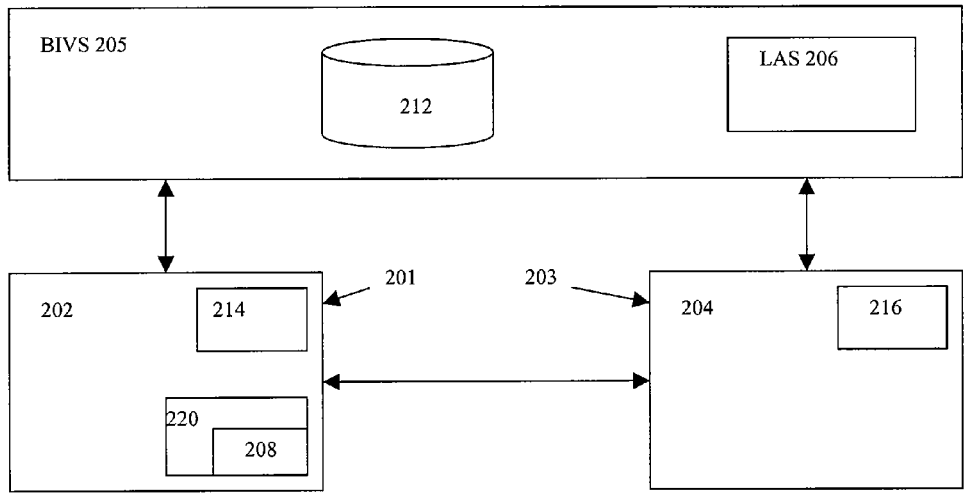
FIG. 4 shows a block diagram of an exemplary embodiment of the inventive license activation system.

Referring now to FIG. 4, another aspect of the inventive system is shown that enables registered users to obtain a licensed product 220, for example, a product incorporating the copyrighted work 200 discussed above, and activate the license by verifying one or more biometric criteria of the intended user/licensee using the biometric identity verification system (BIVS) 205. In addition to the creative work 200, licensed product 220 may include terms and conditions of licensing the product 220. User 201 in FIG. 4 refers to the author or licensor (i.e., an owner, vendor or distributor of a licensed product corresponding to the creative work) of the creative work, and its system 202 may be constructed in a way described above with reference to FIGS. 2 and 3, i.e., the system may be the Level 1, Level 1a or Level 2 system containing the product to be licensed. Further, the licensor's system 202 preferably includes the following capabilities: 1. capability for transmitting information to at least one other system; 2. capability for receiving information from at least one other system; 3. capability for storing data and applications for issuing instructions, and, in response to issued instructions, performing tasks involving data stored therein or provided thereto, sufficient to enable functionality necessary for operation of the disclosed system and method; 4. capability for displaying information relevant to its operation and the performed tasks; 5. capability for communicating with the BIVS system 205 via a communication link 210; and 6. capability for receiving instructions from an operator. System 202 also preferably includes a BIVD 214 for scanning or otherwise retrieving BIVEs.

The embodiment of FIG. 4 further features a licensee 203. The licensee 203 has access to its own system 204, which may communicate with the BIVS system 205 via a communication link 212. Additionally, system 202 of the user 201 and system 204 of the user 203 are able to communicate with each other via a communication link 240. The various communication links shown in FIG. 4 may be similar to at least some of the other links, or may all be of the same configuration (e.g., the Internet). Similarly to system 202, system 204 also preferably includes a BIVD 216 for scanning or otherwise retrieving BIVEs.

BIVS system 205 preferably includes LAS 206 (see definitions in Table 1) as an integrated component. LAS 206 is a license activation management system performing enrollment procedure and verification for user 203 during installation of the product 220. Further, each product 220 prefer includes LAC 208 (see definitions in Table 1). LAC 208 is a software installation package that implements biometric identity management algorithm to connect user 203 to LAS 206, capture and send a user's biometric (e.g., fingerprint) element during installation procedure and to ensure that only previously registered clients would be able to complete installation of the product they had purchased.

Figure 5:
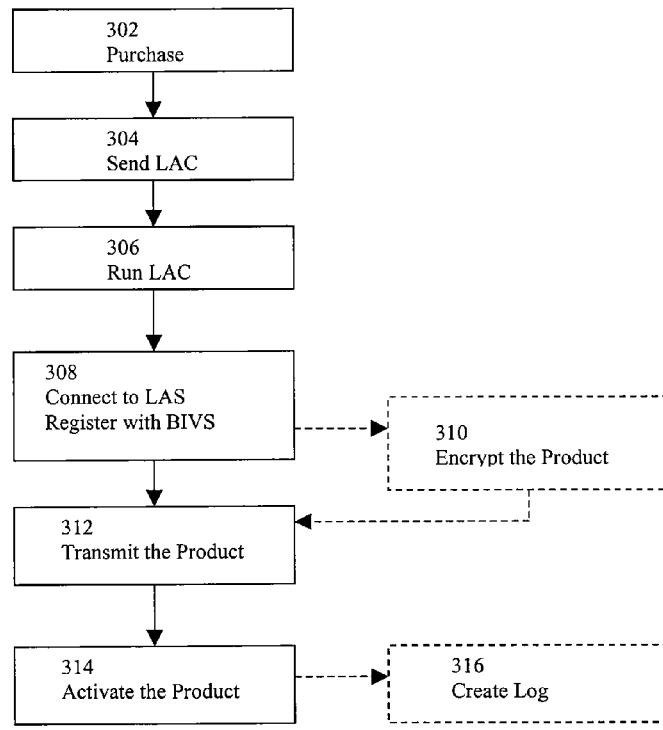
FIG. 5 shows a logic flow diagram of an exemplary embodiment of a process of implementing and utilizing the inventive license activation system shown in FIG. 4.

Referring, to FIG. 5, an exemplary embodiment of a process for accomplishing license activation utilizing the inventive system (for example, the system of FIG. 4) is shown. As a matter of design choice, the various steps of this process may be executed by different components of the inventive system of FIG. 4.

The process of licensing the product 202 may begin at an optional step 302, where a user 203 may purchase a licensed product from a licensor 201. LAC 208 of the purchased licensed product is then sent to the purchasing user at a step 304. Using the embodiment shown in FIG. 4 as an example, step 304 may be accomplished by electronically transmitting LAC 208 from licensor 201 to user 203 via the connection link 240. Alternatively, LAC 208 of the purchased licensed product may be recorded on some electronic media (e.g., hard disk, CD, DVD, etc.) and then physically conveyed to the purchasing user. Next, at a step 306, the purchasing user runs LAC 208 on its system 204 connecting the purchasing user's system to the LAS 206 of the BIVS system 205, where the user performs a registration process (step 308). Purchaser's BIVE is then stored at the biometric database 212 of the BIVS system 205. Alternatively, the purchasing user 203 may register its biometric information with the BIVS system 205 at the time of purchase of the licensed product using the communication link 210 between the licensor 201 and the BIVS system.

After the registration is complete, IBSM System notifies the licensor that the product may be transmitted. At an optional step 310, the licensor encrypts the purchased product (this step is optional because it is possible to control access to the purchased product without encrypting it), which is then transmitted to the purchasing user at a step 312 indicating the purchasing user as the intended recipient. Upon receipt of the licensed product, the user transmits, biometric information acquired through its BIVD 216 in form of a BIVE to the BIVS system, which verifies the supplied BIVE against the BIVE of the authorized user previously stored during registration. Upon successful verification, the product is decrypted (if it was previously encrypted) and product installation process is activated, at a step 314. At an optional step 316, an installation log may be created and stored at the BIVS system to provide the licensor with an easy license record keeping option.

Although, transmission of LAC of the purchased product, encryption of the purchased product and the transmission of the actual purchased product are described as three separate steps (i.e., steps 304, 310 and 312), they can be accomplished simultaneously. In such alternative embodiment, the licensor will transmit the LAC and the encrypted product as one package. However, the user will not be able to access and/or install the licensed product until the registration (step 308) and verification are completed. Accordingly, the creative work incorporated in the licensed product 202 is protected by the disclosed and claimed system and method.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method implemented by a processor for protection of creative works arranged in or embodying a digital format, comprising the steps of:

creating or fixing a creative work in a digital format using a creative device;

securing the creative work by creating a biometric identity verification element (BIVE) comprising biometric information of an author of the creative work, storing the author BIVE in a biometric security database and storing the creative work in a secure creative works database in association with the stored author BIVE;

creating a BIVE comprising biometric identity information for each user seeking access to the creative work, and storing each user BIVE in the biometric security database;

registering the author's and each user's BIVE stored in the biometric security database to define access authorization creative work by association with each registered BIVE; and restricting an access to said creative work to the author and authorized users who are authorized by the author and whose BIVE is registered with the biometric security database.

2. The method for protection of creative works according to claim 1, further comprising creating a date stamp associated with the creative work and storing the date stamp in association with the creative work in the creative works database.

3. The method for protection of creative works according to claim 1, wherein the step of creating the creative work further comprises creating a digital image using a digital image pick-up apparatus.

4. The method for protection of creative works according to claim 3, wherein the step of securing the creative work further comprises providing a biometric identification and verification device on said digital image pick-up apparatus and identifying and verifying said biometric information of said author and said biometric information of said authorized users.

5. The method for protection of creative works according to claim 1, wherein the step of restricting further comprises conveying said creative work to an authorized user.

6. The method for protection of creative works according to claim 5, wherein the step of conveying further comprises encrypting the creative work.

7. The method for protection of creative works according to claim 6, wherein the authorized user of the creative work is identified and verified using the biometric information comprising the BIVE of the actual user stored in the biometric security database, and wherein decrypting the creative work and allowing said actual user to access the creative work occurs only upon such identification and verification.

8. A system for protection of creative works, comprising:
a first level at which a creative work is created, the first level comprising:
a first biometric device for capturing, identifying and verifying biometric information of users,
a first biometric database for storing said biometric information of said user in a form of a biometric identity verification element (BIVE),
means for creating and fixing a creative work in digital format,
a memory for storing the creative work, and
a processor connected to the memory and programmed to control the first biometric device, the means for creating and the first biometric database; and
a second level at which the creative work is uploaded for secured storage and distribution, the second level comprising
a second biometric database, and
a creative works database,
wherein access to the creative work temporarily stored in the memory of the first level is restricted to users whose biometric information is stored as a BIVE in said first biometric database and by which users' BIVE access is authorized,
wherein when the creative work is uploaded at the second level, said creative work is stored at the creative works database in association with the BIVE of authorized users of the creative work, and
wherein access to the creative work stored at the creative works database is restricted to select users, each of whose biometric information is stored as a respective BIVE in said second biometric database and for who said access is authorized by at least one of the authorized users of the creative work.

9. The system for protection of creative works according to claim 8, wherein said first level is a digital camera.

10. The system for protection of creative works according to claim 8 wherein said first level is a mobile communication device.

11. The system for protection of creative works according to claim 8 wherein said first level is an image forming apparatus.

12. The system for protection of creative works according to claim 8 wherein said first level is a personal computer.

13. The system for protection of creative works according to claim 8, wherein said first level further comprises means for creating a date stamp.

14. The system for protection of creative works according to claim 8, wherein said second level further comprises means for creating a date stamp.

15. The system for protection of creative works according to claim 8 further comprising an intermediate level, the intermediate level comprising an intermediate biometric database, an intermediate processor, an intermediate biometric identification and verification device and an intermediate memory.

16. The system for protection of creative works according to claim 15, wherein the creative work is uploaded to the intermediate level and is temporarily stored in the intermediate memory and wherein an access to the creative work temporarily stored in the intermediate memory is restricted to authorized users whose biometric information in a form of a BIVE is stored within and registered with the intermediate biometric database.

17. The system for protection of creative works according to claim 8, wherein said second level further comprises means for conveying the creative work to a select user and means for identifying and verifying the BIVE of the select user prior to said conveying.

18. The system for protection of creative works according to claim 15, wherein said second level further comprises means for encrypting the creative work.

19. The method for protection of creative works according to claim 1, wherein the step of restricting an access includes putting in place a number of rules, defined by the author, or an agent of the author, to regulate rights to the creative work from the group consisting of access, viewing, using, selling, purchasing and distributing.

20. The method for protection of creative works according to claim 7, wherein the identification and verification of the actual user includes capturing biometric information of the actual user and comparing the captured biometric information to the actual user BIVE stored in the biometric security database.

* * * * *